Figure 1:
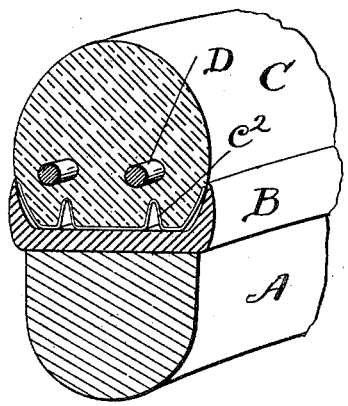

No. 649,721. Patented May 15, 1900.
F. F. FAIRCHILD.
TIRE.
(Application filed Mar. 6, 1900.)
(No Model.)

Witnesses.
E. B. Gilchrist
F. D. Ammen

Inventor,
Frank F. Fairchild,
By his Attorneys,
Thurston & Bates.

UNITED STATES PATENT OFFICE.

FRANK F. FAIRCHILD, OF CLEVELAND, OHIO.

TIRE.

SPECIFICATION forming part of Letters Patent No. 649,721, dated May 15, 1900.

Application filed March 6, 1900. Serial No. 7,497. (No model.)

*To all whom it may concern:*

Be it known that I, FRANK F. FAIRCHILD, a citizen of the United States, residing at Cleveland, in the county of Cuyahoga and State of Ohio, have invented a certain new and useful Improvement in Tires, of which the following is a full, clear, and exact description, reference being had to the accompanying drawings.

My invention relates particularly to vehicle-tires of that class which are made of solid rubber and secured within a suitable channel by retaining bands or wires. In this class of tires as heretofore constructed it has been found impossible to draw the retaining bands or wires so tight that in time dirt or gravel would not work under the tire, and this, as the tire creeps around the rim in running, abrades its under side, soon wearing out the canvas protection. As the wear increases the tire becomes correspondingly loose and the slippage becomes greater, and this soon wears loose the openings in which the retaining wires or bands lie. Now to make these tires fill the channel end compression has been relied on, this compression varying from one-half to one and one-half inches to the foot; but as the tire becomes loose this compression reacts to extend the tire, leaving large gaps between it and the channel, with the result that not infrequently the tire becomes wrenched out of the channel entirely while running over car-tracks, for example, or around curves. Moreover, as the tire begins to wear loose it travels back and forth sidewise in going around curves and becomes smaller than the size required to fill the channel, wherefore it is impossible to materially help the tire by resetting.

The object of my invention is to provide a very simple and cheaply-constructed tire which shall overcome these difficulties—a tire which may be caused to fit the channel so tightly as to prevent the working in of dirt or grit, while obviating the injurious end compression referred to. I accomplish this object by forming on the inner side of the tire beneath the retaining band or wires one or more grooves or recesses, which when the bands are tightened cause the tire to flare laterally, binding tightly against the inside of the channel. By this construction I am enabled to not only make the tire fit the channel with the desired tightness by reason of the lateral compression of the tire into the corners of the channel when it is first set, but after long wear when it becomes loose it may be again forced to its seat by retightening of the wires, the allowable spreading of the base of the tire due to the grooves being not all availed of at the first setting. Such a tire is shown in the drawings, wherein it appears in perspective section.

Figure 2:
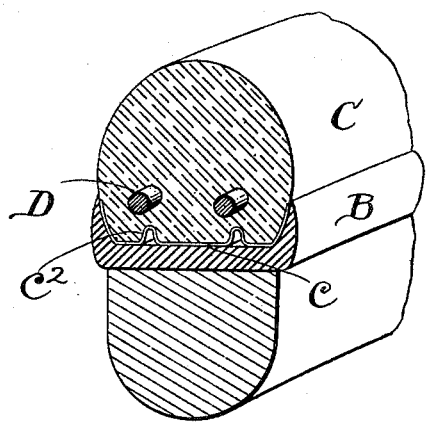
Figure 3:
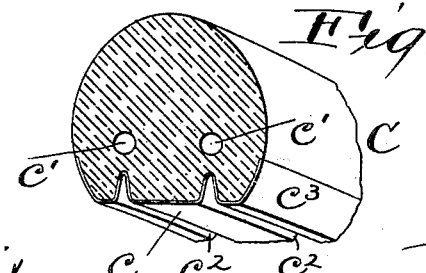

Figure 1 shows it as first applied to the channel on the rim of the wheel before being secured, the discrepancy in fit being exaggerated for purposes of illustration. Fig. 2 shows it after the bands have been tightened, and Fig. 3 shows the tire by itself.

Referring to the parts by letters, A represents a wheel-rim, and B a channel-iron secured on the outer periphery thereof.

C represents my tire. It is made of solid rubber of a desirable shape with a flattened base $c$, adapted to rest on the flat part of the channel. One or more longitudinal openings $c'$ are provided in the tire, through which the retaining band or bands D pass, two being shown in the drawings, which is the preferable form. Directly beneath the retaining-band is a recess or groove $c^2$ in the tire extending around the inner face thereof of a shape shown in Figs. 1 and 3. On the under side of the tire is a piece of canvas $c^3$, which preferably occupies the grooves also. When this tire is first placed in the channel, it fits it as closely as may be; but when the wires are drawn tight the lower corners of the tire are pressed outward very snugly into engagement with the channel by reason of the grooves beneath the retaining-bands. After the tire becomes worn a further tightening of the wires presses the tire still more into the corners, maintaining it snug. I have found that the best effects are produced by two retaining-wires and two grooves rather deep and narrow slightly flaring and slightly curved at their points, as shown.

Having described my invention, I claim—

1. The combination of a wheel-rim, a channel thereon having a flat seat, a solid-rubber tire lying within said channel, one or more grooves on the inner face of the tire whereby openings are comprehended between the tire and the channel, and one or more retaining bands or wires extending longitudinally through the tire directly over said grooves, substantially as described.

2. The combination with a wheel-rim, and a channel thereon having a flat seat and outwardly-flaring sides, of a solid-rubber tire seating in said channel and having a flat base and outwardly-flaring sides near said base whereby the tire may be freely inserted or removed from the channel, a pair of retaining-wires extending longitudinally through said tire, and a pair of grooves in the inner face of the tire each directly beneath a retaining-wire which grooves are unobstructed by the channel and allow the sidewise compression of the tire by the tension on the retaining-wires, substantially as described.

3. A rubber tire having a longitudinal opening for the reception of a retaining wire or band, a groove in the inner face of the tire directly beneath said opening, and a protective strip secured to said inner face and extending into said groove, substantially as described.

4. A vehicle-tire consisting of solid rubber flattened on its inner face, a pair of longitudinal openings extending through the tire for the reception of retaining wires or bands, a pair of comparatively-deep grooves extending from the inner face of the tire directly beneath said openings, said grooves flaring outward toward said flattened face, substantially as described.

In testimony whereof I hereunto affix my signature in the presence of two witnesses.

FRANK F. FAIRCHILD.

Witnesses:
F. D. AMMEN,
ALBERT H. BATES.